United States Patent
Jeyaraman

(10) Patent No.: US 7,036,110 B2
(45) Date of Patent: *Apr. 25, 2006

(54) MECHANISM TO MANAGE THE LIFECYCLE OF A RESOURCE ADAPTER

(75) Inventor: Thulasiraman Jeyaraman, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 570 days.

This patent is subject to a terminal disclaimer.

(21) Appl. No.: 10/106,671

(22) Filed: Mar. 25, 2002

(65) Prior Publication Data

US 2003/0182459 A1    Sep. 25, 2003

Related U.S. Application Data

(60) Provisional application No. 60/367,138, filed on Mar. 21, 2002.

(51) Int. Cl.
*G06F 9/44*    (2006.01)

(52) U.S. Cl. ............ 717/120; 709/223; 719/316; 714/2

(58) Field of Classification Search ........ 717/120–121, 717/127, 102–103; 719/310, 316, 318, 328, 719/330; 718/106; 709/203, 223, 224; 714/38, 714/48, 2; 712/244; 713/2
See application file for complete search history.

(56) References Cited

U.S. PATENT DOCUMENTS

| | | | |
|---|---|---|---|
| 5,787,245 A | 7/1998 | You et al. ................... 714/38 |
| 5,835,770 A * | 11/1998 | Shum et al. ................ 717/127 |
| 6,003,050 A | 12/1999 | Silver et al. ................ 715/536 |
| 6,038,590 A | 3/2000 | Gish ........................... 709/203 |
| 6,708,163 B1 | 3/2004 | Kargupta et al. ............. 707/3 |
| 6,721,777 B1 * | 4/2004 | Sharma ....................... 718/101 |
| 6,757,899 B1 | 6/2004 | Zhdankin et al. ........... 719/315 |
| 6,816,882 B1 | 11/2004 | Conner et al. .............. 709/203 |
| 6,826,716 B1 | 11/2004 | Mason ........................ 714/38 |
| 2002/0147961 A1 * | 10/2002 | Charters et al. ............ 717/101 |
| 2003/0093402 A1 * | 5/2003 | Upton .......................... 707/1 |
| 2003/0093470 A1 * | 5/2003 | Upton ........................ 709/203 |
| 2003/0097574 A1 * | 5/2003 | Upton ........................ 713/183 |
| 2003/0105884 A1 * | 6/2003 | Upton ........................ 709/318 |
| 2003/0182452 A1 * | 9/2003 | Upton ........................ 709/246 |
| 2003/0236923 A1 | 12/2003 | Jeyaraman et al. ......... 719/318 |
| 2004/0015974 A1 | 1/2004 | Jeyaraman .................. 718/104 |

* cited by examiner

*Primary Examiner*—Antony Nguyen-Ba
(74) *Attorney, Agent, or Firm*—Beyer Weaver & Thomas, LLP

(57) ABSTRACT

Providing a contract between an application server and a resource adapter that allows the application server to manage the lifecycle of the resource adapter. When deploying a resource adapter (or during application server startup), an application server bootstraps a resource adapter instance in an appropriate address space. When a resource adapter is undeployed (or during application server shutdown), the application server notifies the resource adapter instance to stop functioning in order to allow safe unloading. The contract provides a mechanism for an application server to manage the lifecycle of a resource adapter instance, allowing an application server to bootstrap a resource adapter instance during resource adapter deployment or application server startup and to expose some of its useful facilities to the resource adapter instance. It also provides a mechanism to notify the resource adapter instance while it is undeployed or during an orderly shutdown of the application server.

15 Claims, 3 Drawing Sheets

MECHANISM TO MANAGE THE LIFECYCLE OF A RESOURCE ADAPTER

CROSS REFERENCE TO RELATED APPLICATIONS

This application takes priority under 35 U.S.C. §119(e) of U.S. Provisional Patent Application No. 60/367,138 filed Mar. 21, 2002, entitled "J2EE CONNECTOR ARCHITECTURE" naming Thulasiraman Jeyaraman as inventor, which is also incorporated herein by reference for all purposes. This application is also related to the following co-pending U.S. patent applications, which are filed concurrently with this application and each of which are herein incorporated by reference, (i) U.S. patent application Ser. No. 10/106,680, entitled "ARCHITECTURE FOR PLUGGING MESSAGING SYSTEMS INTO AN APPLICATION SERVER" naming Jeyaraman as inventor; (ii) U.S. patent application Ser. No. 10/106,293, entitled "CALLBACK EVENT LISTENER MECHANISM FOR RESOURCE ADAPTER WORK EXECUTIONS PERFORMED BY AN APPLICATION SERVER THREAD" naming Jeyaraman as inventor each of which are incorporated by reference in their entirety.

BACKGROUND OF THE INVENTION

1. Field of Invention

The invention relates generally to computer systems. More particularly, methods and apparatus for managing a lifecycle of a resource adapter by an associated application server.

2. Description of Relevant Art

In modern Enterprise Information Systems (EIS) is formed to include a number of EIS resources. An EIS resource provides EIS-specific functionality to its clients examples of which include a record or set of records in a database system, a business object in an ERP system, and a transaction program in a transaction processing system. Generally, an EIS is formed of a number of interconnected personal computers, workstations, mainframes, and the like along with other devices such as large mass storage subsystems, network interfaces, as well as interfaces to the public telephony systems are interconnected providing an integrated environment in which information may be shared among the various users. Typically, users may be performing a variety of operations, including order receipt, manufacturing, shipping, billing, inventory control, and other operations in which sharing of data on a real time basis provides a significant advantage over, for example, maintaining separate records and attempting to reconcile them later.

The Java™ 2 Platform, Enterprise Edition (J2EE™) provides containers for client applications, web components (based on servlets, Java ServerPages™) and Enterprise JavaBeans™ components. These containers provide deployment and runtime support for application components as well as an integrated view of the services provided by underlying application server for the associated application components. Containers can run on existing systems such as, for example, web servers (for the web containers) application servers, TP monitors, and database systems for EJB containers enabling EISs to leverage both the advantages of their existing systems and those of J2EE™. For example, EISs can write (or rewrite) new applications using J2EE™ capabilities and can also encapsulate parts of existing applications in Enterprise JavaBeans™ (EJB), Message Driven Beans (MDB), Java ServerPages™ (JSP) or Servlets. IN addition, EIS applications access functions and data associated with applications running on Enterprise Information Systems (EIS).

The J2EE™ Connector architecture defines standard contracts which allows bi-directional connectivity between enterprise applications and EISs. An architecture for integration of J2EE™ servers with EISs is referred to as a connector architecture. There are two parts to the connector architecture: an EIS vendor-provided resource adapter and an application server that allows this resource adapter to plug in. The contracts support bi-directional communication between the application server and the resource adapter.

In the context of this discussion, a resource adapter is a system-level software driver that is used by a Java™ application to connect to an EIS. When a resource adapter is deployed (or during application server startup), an application server needs to bootstrap an instance of the resource adapter in an appropriate address space. When a resource adapter is undeployed (or during application server shutdown), the application server must notify the resource adapter instance to stop functioning accordingly so that it can be safely unloaded.

Therefore, what is needed is a lifecycle management mechanism that provides a mechanism for an application server to manage the lifecycle of a resource adapter instance. This allows an application server to bootstrap a resource adapter instance during resource adapter deployment or application server startup and also to expose some of its useful facilities to the resource adapter instance. It also provides a mechanism to notify the resource adapter instance to stop functioning while it is being undeployed or during an orderly shutdown of the application server.

SUMMARY OF THE INVENTION

Broadly speaking, the invention relates to an improved method, system, and apparatus for managing a lifecycle of a resource adapter by an application server. As a method, the resource adapter is configured after which the configured resource adapter is deployed to the application server. The application server then bootstraps the configured resource adapter which notifies the bootstrapped configured resource adapter to shutdown when needed.

In another embodiment of the invention, an apparatus for managing a lifecycle of a resource adapter by an application server is described. The apparatus includes means for configuring the resource adapter, means for deploying the configured resource adapter, means for bootstrapping the configured resource adapter by the application server, and means for notifying the bootstrapped configured resource adapter to shutdown by the application server.

In yet another embodiment of the invention, a computer program product for managing a lifecycle of a resource adapter by an application server is described. The computer program product includes computer code for configuring the resource adapter, computer code for deploying the configured resource adapter, computer code for bootstrapping the configured resource adapter by the application server, computer code for notifying the bootstrapped configured resource adapter to shutdown by the application server, and a computer readable medium for storing the computer program product.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, there is described an improved method, system, and apparatus for providing a contract between an application server and a resource adapter that allows an application server to manage the lifecycle of a resource adapter. When a resource adapter is deployed (or during application server startup), an application server must bootstrap an instance of the resource adapter in an appropriate address space. In those situations where a resource adapter is undeployed (or during application server shutdown), the application server provides a mechanism to notify the resource adapter instance to stop functioning so that it can be safely unloaded.

In this way, the lifecycle management contract provides a mechanism for an application server to manage the lifecycle of a resource adapter instance. This allows an application server to bootstrap a resource adapter instance during resource adapter deployment or application server startup and also to expose some of its useful facilities to the resource adapter instance. It also provides a mechanism to notify the resource adapter instance while it is undeployed or during an orderly shutdown of the application server.

Although, the invention will initially be described in terms of a object based system as part of a J2EE™ based enterprise computer system, the present invention can be used in any networked computer system.

Figure 1:
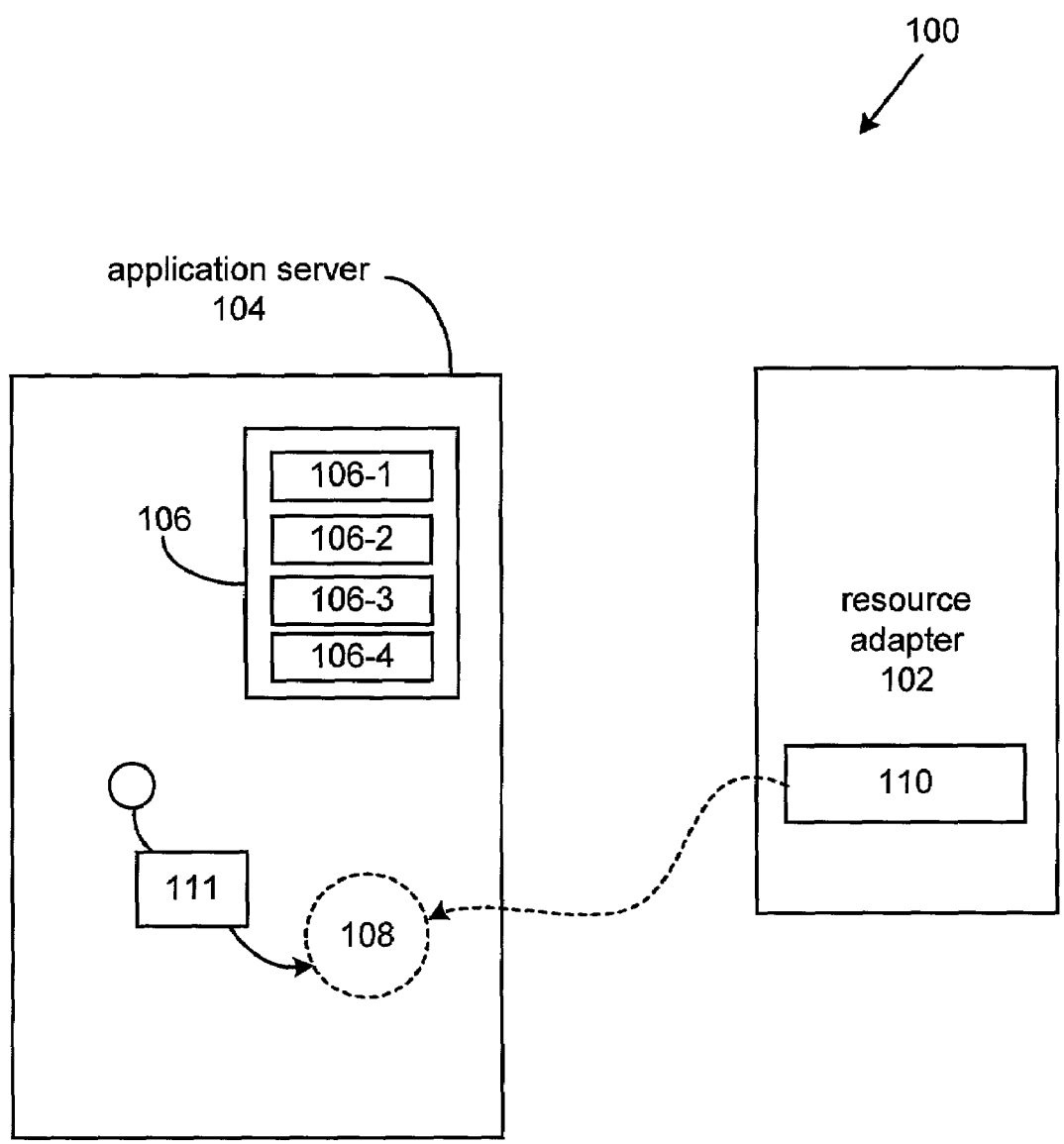
FIG. 1 shows system for managing a lifecycle of a resource adapter by an application server in accordance with an embodiment of the invention.

Accordingly, FIG. 1 shows system 100 for managing a lifecycle of a resource adapter 102 by an application server 104 in accordance with an embodiment of the invention. During startup, the application server 104 initializes itself and sets up its internal data structures 106 (work manager 106-1, transaction manager 106-2, security manager 106-3, connection manager 106-4, etc). When the resource adapter 102 is deployed (or during start up of the application server 104), the application server 104 bootstraps an instance 108 of the resource adapter 102 in its address space. In the described embodiment, the application server 104 does this by creating the resource adapter instance 108 using the implementation class name of the resource adapter interface specified in a resource adapter deployment descriptor 110. It should be noted that each resource adapter instance represents at most one functional resource adapter or instance and, accordingly, the application server 104 must instantiate at least one resource adapter instance for every resource adapter deployed. In the described J2EE™ implementation, the resource adapter class is implemented as a JavaBean™ thereby allowing various tools to be used to configure the resource adapter instance 108 prior to its deployment.

For each resource adapter deployment, it is possible that the application server 104 may create more than one resource adapter instance. In this case, the application server 104 must isolate each resource adapter instance from all other resource adapter instances regardless of whether other resource adapter instances were created from the same deployment or not. In this way, each functional resource adapter unit is isolated from (and therefore cannot share a common class loader with) other such functional units assuring that there cannot be a shared state between multiple resource adapter instances thereby providing isolation among different resource adapter instances.

As part of the bootstrap procedure, the application server 104 provides a non-null bootstrap context instance 111 containing references to some of the application server facilities 106 (work manager 106-1, etc) for use by the resource adapter instance 108. The application server facilities 106 exposed via the bootstrap context instance 111 could be used by the resource adapter instance 108 during its lifetime. For example, during the bootstrap procedure (i.e., the start call) the resource adapter instance initializes itself and could use the work manager 106-1 to submit work instances for execution (however, it is also possible that some of the exposed application server facilities 106 may become unavailable at certain times). It should be noted that any exception thrown during the start call causes the application server 104 to abort the bootstrap procedure for the specific resource adapter instance.

In those cases, where a resource adapter is undeployed (or during application server shutdown), the application server 104 initiates a stop call to notify the resource adapter instance 108 to stop functioning so that it can be safely unloaded. In the described embodiment, during the stop call, the resource adapter instance 108 does an orderly shutdown of its internal resources and releases all active work instances. In addition to shutting down of its internal resources, some of the application server services may become unavailable (i.e., with the work manager facility, work submissions may be rejected during the stop call). Accordingly the resource adapter instance 108 must be prepared to do cleanup work using the application server thread which is executing the stop call or using other work instances which are already executing. Additionally, during the stop call, the resource adapter instance must make unusable (i.e., invalid) all resources (connections, etc) exposed to the application server 104 and application components. Any further attempt to use such invalid resources results in an exception being thrown which the application server does not act on since the application server ignores any exception thrown during the stop call. It should be noted that it is possible for a resource adapter instance to become non-functional during its lifetime even before stop call is instituted, due to EIS failure, for example, or other reasons. In such cases, the resource adapter instance 108 throws an exception when it is accessed to indicate the failure condition.

Though lifecycle management contract is primarily intended for a managed environment, it could still be used in a non-managed environment provided the application which bootstraps a resource adapter instance is capable of managing its lifecycle. A resource adapter is required to support lifecycle management contract in a non-managed environment.

Figure 2:
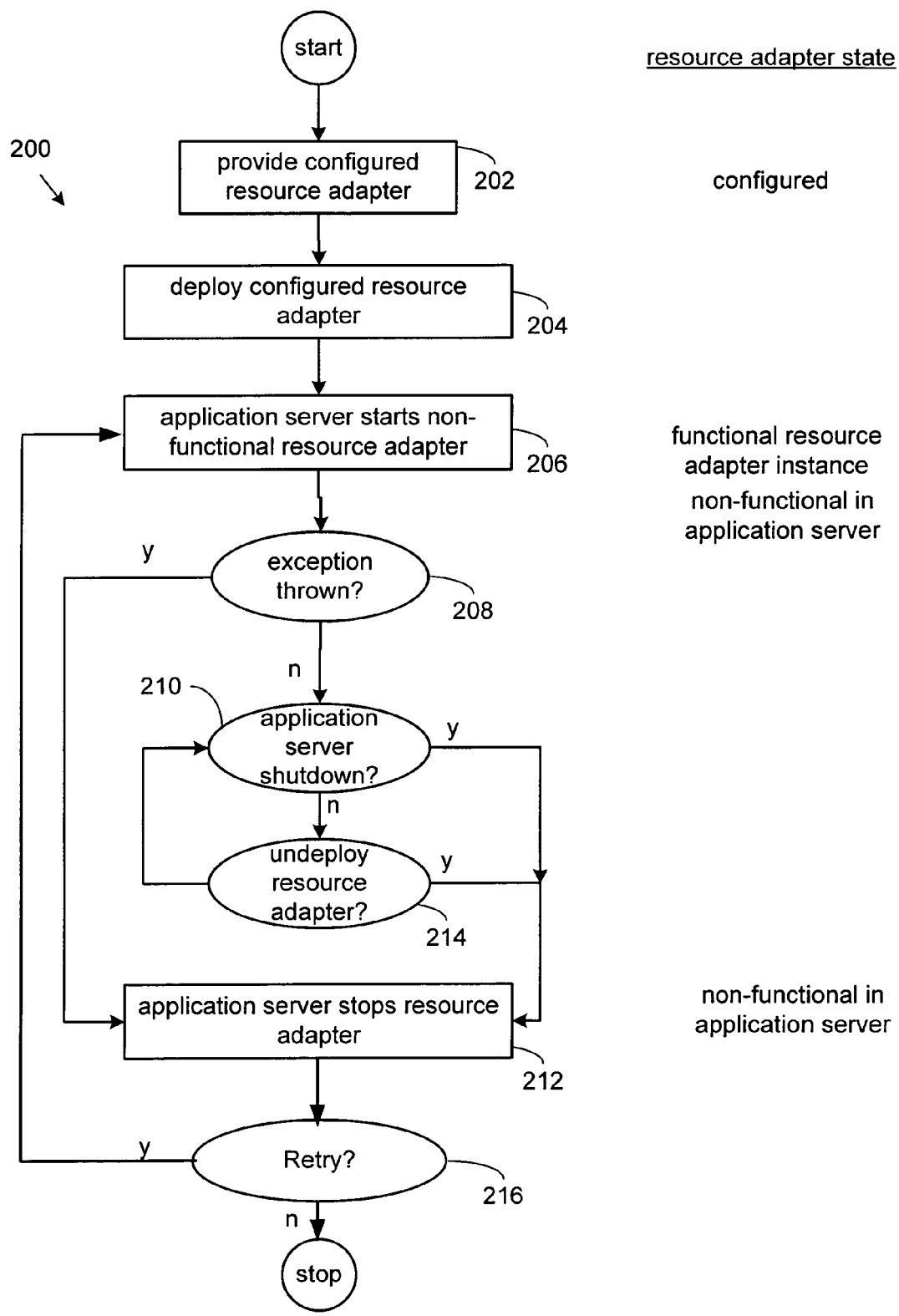
FIG. 2 shows a flowchart detailing a process for managing a resource adapter lifecycle by an application server in accordance with an embodiment of the invention.

FIG. 2 shows a flowchart detailing a process 200 for managing a resource adapter lifecycle by an application server in accordance with an embodiment of the invention. Accordingly, the process 200 begins at 202, in some cases using a deployment tool, a resource adapter provider (also referred to as a deployer) provides a configured resource adapter. It should be noted that the resource adapter provider is an expert in the technology related to an EIS and is responsible for providing a resource adapter for an EIS. Since this role is highly EIS specific, an EIS vendor typically provides the resource adapter for its system. A third party vendor (who is not an EIS vendor) may also provide an EIS resource adapter and its associated set of application development tools. Such a provider typically specializes in writing resource adapters and related tools for a large number of EISs. At 204, the configured resource adapter is deployed to application server by bootstrapping an instance of the resource adapter in its address space. In the described embodiment, as part of the bootstrapping, the application server provides a non-null bootstrap context instance containing references to some of the application server facilities (work manager, etc.) for use by the resource adapter instance. At 206, the resource adapter instance initializes itself after which the resource adapter instance could use the work manager, for example, to submit work instances for execution. If at anytime during the bootstrapping an exception is thrown at 208, then the bootstrapping has failed and the process stops (or may be re-tried at a later time, as shown in 216). At 210, a determination is made whether or not the application server has shut down. If it is determined that the application server has shut down, then the application server stops the resource adapter at 212 otherwise a determination is made at 214 whether or not to undeploy the resource adapter. If it has been determined that the resource adapter is to be undeployed, then control is passed to 212 otherwise control is passed back to 210. After the resource adapter has been stopped at 212, a determination is made at 216 whether or not to retry the bootstrapping of the resource adapter. If the bootstrapping is to be retried, the process returns to 206, otherwise the process ends.

Figure 3:
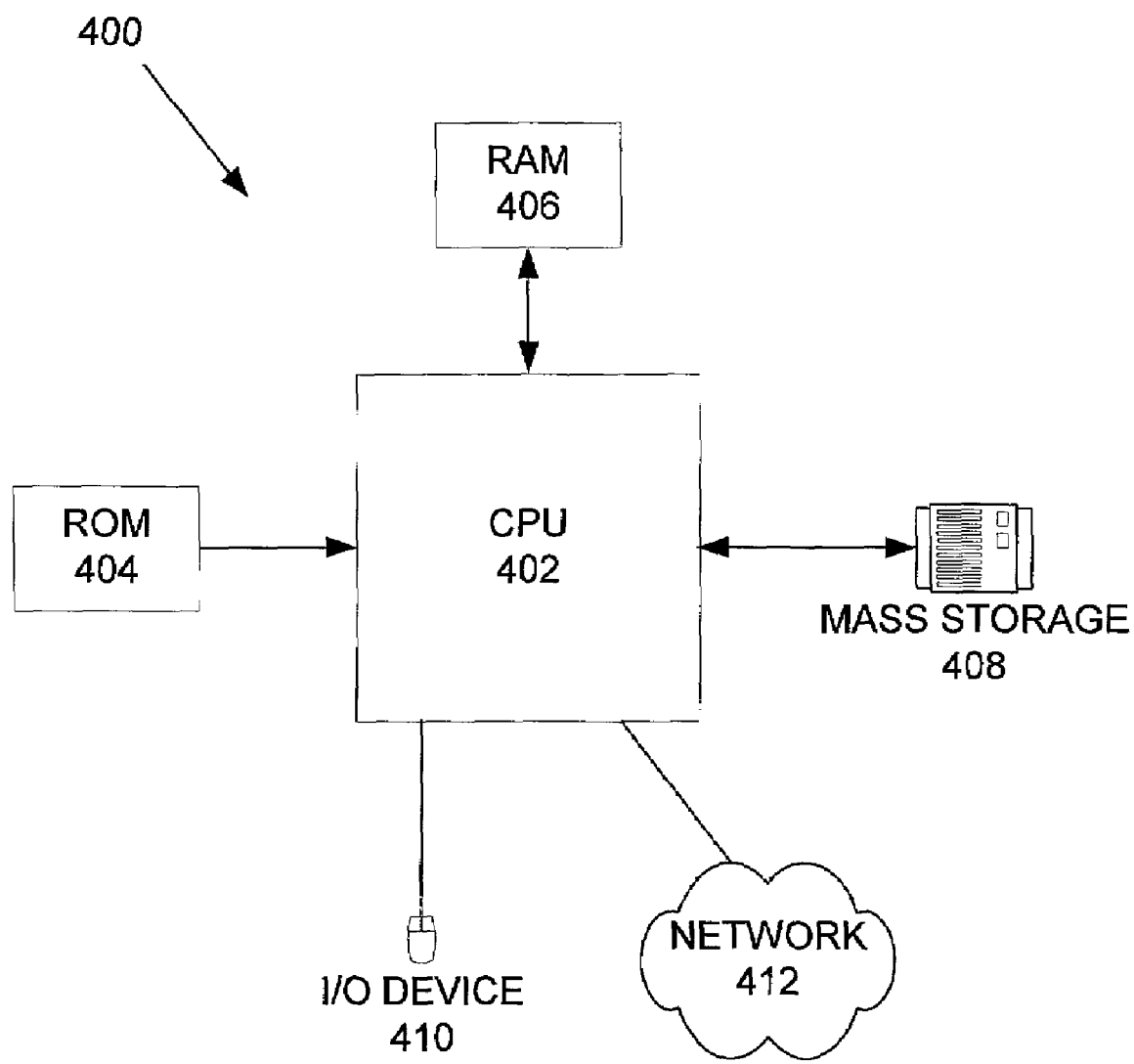
FIG. 3 illustrates a computer system that can be employed to implement the present invention.

FIG. 3 illustrates a computer system 400 that can be employed to implement the present invention. The computer system 400 or, more specifically, CPUs 402, may be arranged to support a virtual machine, as will be appreciated by those skilled in the art. As is well known in the art, ROM acts to transfer data and instructions uni-directionally to the CPUs 402, while RAM is used typically to transfer data and instructions in a bi-directional manner. CPUs 402 may generally include any number of processors. Both primary storage devices 404, 406 may include any suitable computer-readable media. A secondary storage medium 408, which is typically a mass memory device, is also coupled bi-directionally to CPUs 402 and provides additional data storage capacity. The mass memory device 408 is a computer-readable medium that may be used to store programs including computer code, data, and the like. Typically, mass memory device 408 is a storage medium such as a hard disk or a tape which generally slower than primary storage devices 404, 406. Mass memory storage device 408 may take the form of a magnetic or paper tape reader or some other well-known device. It will be appreciated that the information retained within the mass memory device 408, may, in appropriate cases, be incorporated in standard fashion as part of RAM 406 as virtual memory. A specific primary storage device 404 such as a CD-ROM may also pass data uni-directionally to the CPUs 402.

CPUs 402 are also coupled to one or more input/output devices 410 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 402 optionally may be coupled to a computer or telecommunications network, e.g., an Internet network, or an intranet network, using a network connection as shown generally at 412. With such a network connection, it is contemplated that the CPUs 402 might receive information from the network, or might output information to the network in the course of performing the above-described method steps. Such information, which is often represented as a sequence of instructions to be executed using CPUs 402, may be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

Although only a few embodiments of the present invention have been described, it should be understood that the present invention may be embodied in many other specific forms without departing from the spirit or the scope of the present invention.

Although the methods of providing resource adapter lifecycle management in accordance with the present invention are particularly suitable for implementation with respect to a Java™ based environment; the methods may generally be applied in any suitable object-based environment. In particular, the methods are suitable for use in platform-independent object-based environments. It should be appreciated that the methods may also be implemented in some distributed object-oriented systems.

It should also be appreciated that the present invention may generally be implemented on any suitable object-oriented computer system. Therefore, the present examples are to be considered as illustrative and not restrictive, and the invention is not to be limited to the details given herein, but may be modified within the scope of the appended claims along with their full scope of equivalents.

What is claimed is:

1. A method for managing a lifecycle of a resource adapter by an application server, comprising:
    configuring the resource adapter;
    deploying the configured resource adapter, including instantiating a resource adapter instance in an associated memory space of the application server and exposing a set of application server facilities to the instantiated resource adapter instance;
    bootstrapping the configured resource adapter by the application server; and
    notifying the bootstrapped configured resource adapter to shutdown by the application server.

2. A method as recited in claim 1, wherein the set of application server facilities includes, a work manager facility, a security manager facility, and a connection manager facility.

3. A method as recited in claim 1, further comprising:
    determining if an exception has been thrown during the bootstrapping;
    if it has been determined that the exception has been thrown during the bootstrapping, then
        stopping the bootstrapping; and
        retrying the bootstrapping subsequent to the stopping.

4. A method as recited in claim 1, further comprising:
    determining if the application server is shutting down;
    if it is determined that the application server is shutting down, then
        notifying the resource adapter instance to stop functioning.

5. A method as recited in claim 4, further comprising:
    when the resource adapter has stopped functioning,
        undeploying the stopped resource adapter.

6. An apparatus for managing a lifecycle of a resource adapter by an application server, comprising:
    a processor; and
    a memory storing computer instructions for:
        configuring the resource adapter;
        deploying the configured resource adapter, including instantiating a resource adapter instance in an associated memory space of the application server and exposing a set of application server facilities to the instantiated resource adapter instance;
        bootstrapping the configured resource adapter by the application server; and
        notifying the bootstrapped configured resource adapter to shutdown by the application server.

7. An apparatus as recited in claim 6, wherein the set of application server facilities includes, a work manager facility, a security manager facility, and a connection manager facility.

8. An apparatus as recited in claim 6, wherein the memory further includes computer instructions for:
    determining if an exception has been thrown during the bootstrapping;
    if it has been determined that the exception has been thrown during the bootstrapping, then
        stopping the bootstrapping; and
        retrying the bootstrapping subsequent to the stopping.

9. An apparatus as recited in claim 6, wherein the memory further includes computer instructions for:
    determining if the application server is shutting down;
    if it is determined that the application server is shutting down, then
        notifying the resource adapter instance to stop functioning.

10. An apparatus as recited in claim 9, wherein the memory further includes computer instructions for:
    when the resource adapter has stopped functioning,
        undeploying the stopped resource adapter.

11. A computer program product, stored on a computer-readable storage medium, for managing a lifecycle of a resource adapter, comprising instructions operable to cause a computer to:
    configure the resource adapter;
    deploy the configured resource adapter, including instantiating a resource adapter instance in an associated memory space of the application server and exposing a set of application server facilities to the instantiated resource adapter instance;
    bootstrap the configured resource adapter by the application server; and
    notify the bootstrapped configured resource adapter to shutdown by the application server.

12. A computer program product as recited in claim 11, wherein the set of application server facilities includes, a work manager facility, a security manager facility, and a connection manager facility.

13. A computer program product as recited in claim 11, further comprising instructions to:
    determine if an exception has been thrown during the bootstrapping;
    if it has been determined that the exception has been thrown during the bootstrapping, then
        stop the bootstrapping; and
        retry the bootstrapping subsequent to the stopping.

14. A computer program product as recited in claim 11, further comprising instructions to:
    determine if the application server is shutting down;
    if it is determined that the application server is shutting down, then
        notify the resource adapter instance to stop functioning.

15. A computer program product as recited in claim 14, further comprising instructions to:
    when the resource adapter has stopped functioning,
        undeploy the stopped resource adapter.

* * * * *